US005839237A

United States Patent [19]

Davidson

[11] Patent Number: 5,839,237

[45] Date of Patent: Nov. 24, 1998

[54] GARAGE DOOR DECORATIVE COVER

[75] Inventor: Ray E. Davidson, 2132 Gardenway Drive, Orleans, Ontario, Canada, K4A 3M2

[73] Assignee: Ray E. Davidson, Orleans, Canada

[21] Appl. No.: 819,435

[22] Filed: Mar. 17, 1997

Related U.S. Application Data

[63] Continuation-in-part of Ser. No. 619,441, Mar. 21, 1996, Pat. No. 5,649,390.

[30] Foreign Application Priority Data

Feb. 13, 1996 [CA] Canada .................................. 2169383

[51] Int. Cl.[6] .................................................... B62D 63/04

[52] U.S. Cl. ........................ 52/3; 52/63; 52/105; 52/202; 52/745.6; 52/745.15; 140/601; 140/603; 160/179

[58] Field of Search .................................... 52/3, 63, 105, 52/202, 745.06, 745.15; 40/601, 603; 160/179

[56] References Cited

U.S. PATENT DOCUMENTS 4,590,714 5/1986 Walker .
4,805,735 2/1989 Anderson .
4,815,562 3/1989 Denny et al. .
4,875,549 10/1989 Denny et al. .
5,197,239 3/1993 Glynn et al. .
5,649,390 7/1997 Davidson ..................................... 52/3

*Primary Examiner*—Carl D. Friedman
*Assistant Examiner*—Yvonne Horton-Richardson

[57] ABSTRACT

A decorative cover for a movable garage door and method of attachment thereof are provided that allow festive ornamentation of ordinary garage doors while maintaining full use of such garage doors. The decorative cover can be made of weather resistant material and printed with various festive designs on its surface. The decorative cover is installed by draping it onto the front of the garage door. The cover is then joined together by any of several tethering and attaching methods to secure the cover to the garage door to allow full opening and closing without the cover riding up or down relative to the door. The attachment methods also take up slack in the cover.

24 Claims, 7 Drawing Sheets

GARAGE DOOR DECORATIVE COVER

This is a Continuation-in-Part of application Ser. No. 08/619,441, filed Mar. 21, 1996, now U.S. Pat. No. 5,649,390.

BACKGROUND OF THE INVENTION

The invention relates to a decorative cover for garage doors that can be easily removably affixed to a movable hinged garage door to provide an aesthetically pleasing exterior cover that can include printed indicia.

OBJECTS AND SUMMARY OF THE INVENTION

It is an object of the invention to provide an additional type of decorating ornament for residential dwellings. This decorative ornament can be easily affixed to a surface of a garage door and can remain affixed during normal opening and closing of the garage door without interference with or by the door.

The above and other objects are achieved by: a combination garage door and decorative cover, comprising: a garage door positionable between open and closed positions; a decorative cover fixedly located on an exterior front side of the garage door; and attachment devices affixing at least top and bottom ends of the decorative cover directly to the garage door in a manner that allows partial movement of the decorative cover to allow for normal opening and closing of the garage door and taking up of slack in the decorative cover without the decorative cover riding up or down relative to the garage door.

BRIEF DESCRIPTION OF THE DRAWINGS

The invention will be described in detail with reference to the following drawings wherein.

DETAILED DESCRIPTION OF PREFERRED EMBODIMENTS

Figure 1:
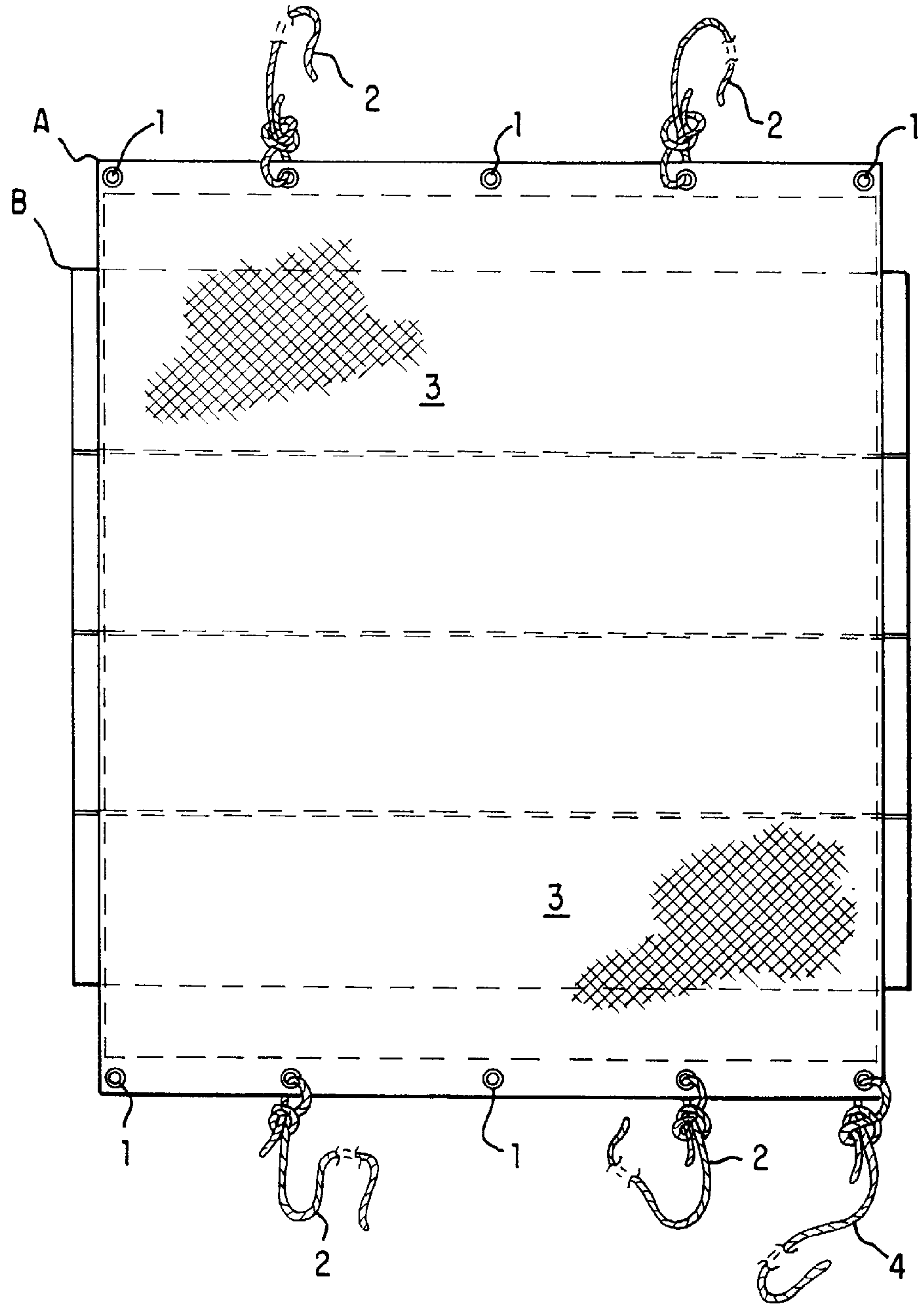
FIG. 1 illustrates a view of an extended decorative cover A and a garage door B.

With reference to FIG. 1, there is shown a decorative cover A for a garage door B of the type having a plurality of hinged door segments. The decorative cover A is formed preferably from a weather-resistant material, such as a tarpaulin, and can be insulative. The cover may also be formed from a stretchable material such as rubber, spandex or other woven, stretchable fabrics. Preferred decorative covers are sized to substantially or fully cover the garage door. The decorative cover A may be sized larger in at least one dimension than the garage door B to allow the cover A to wrap around the garage door B as better illustrated in FIGS. 2, 6 and 7.

At least top and bottom ends of the cover A include attachment devices, which preferably include spaced grommets 1 and tether devices 2, for attachment of the cover A directly to the garage door to prevent the cover from riding up or down during opening of the garage door. The tether devices 2 can include tether cords, hooks or the like. At least one flexible attachment device 4, such as a bungie-type or other elastic cord, is also provided. Alternatively, to the use of elastic cords, the material may be such that the cover stretches during opening and closing of the door and returns to shape when the door is closed. Preferably, the surface 3 of the cover is suitable for festive indicia or advertisement to be printed thereon.

Figure 2:
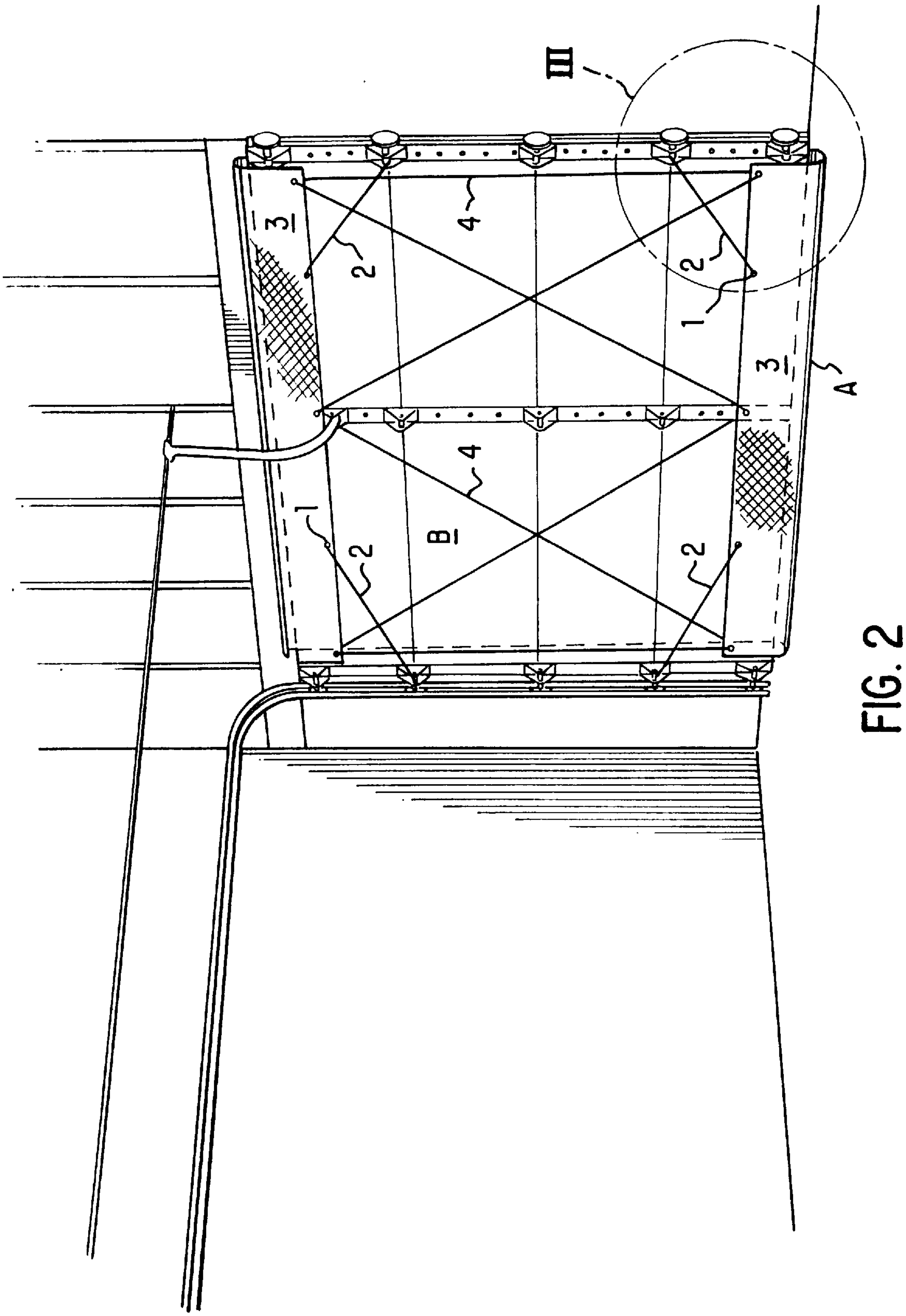
FIG. 2 illustrates a perspective rear view of the decorative cover A installed to garage door B.
Figure 3:
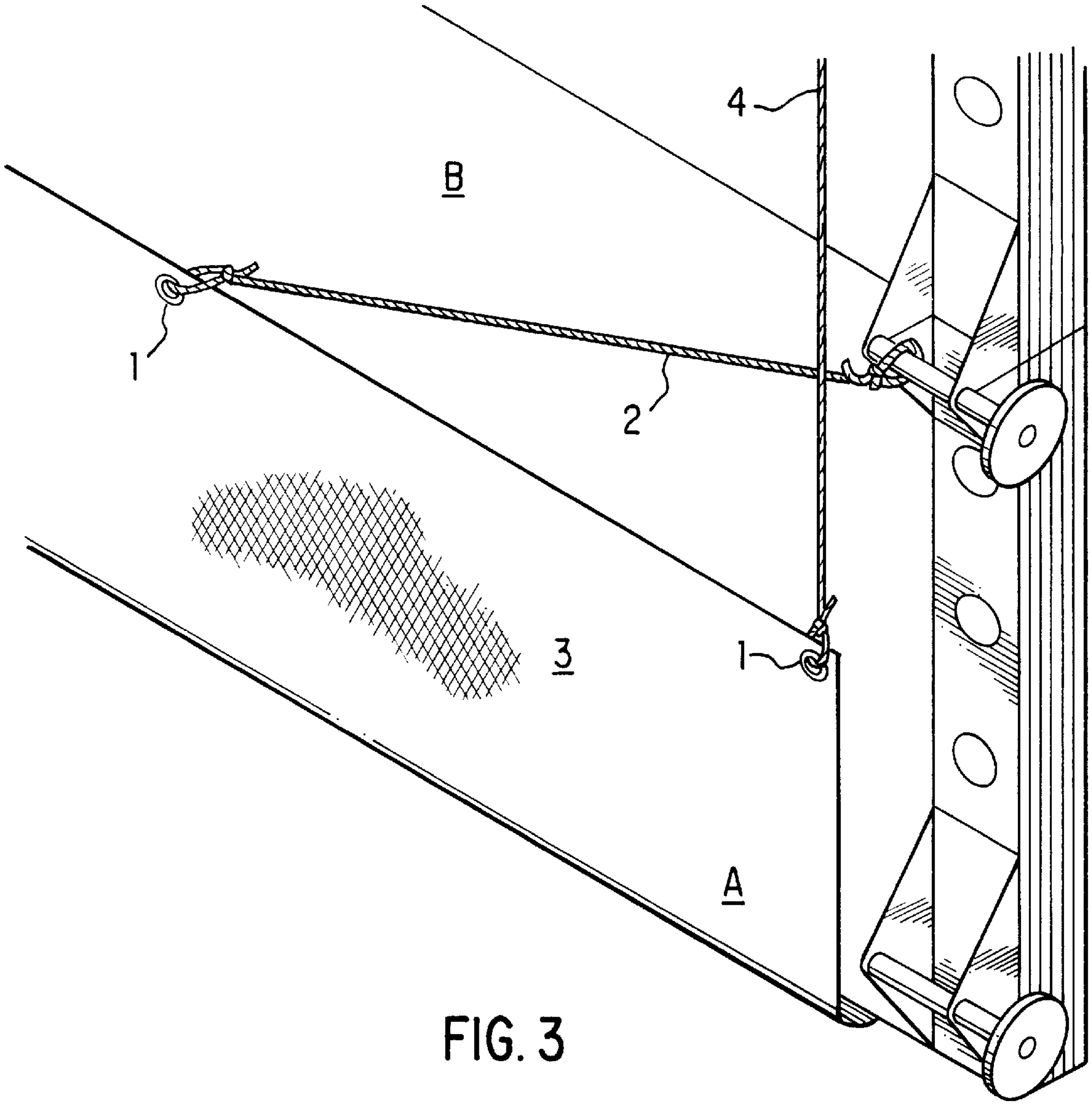
FIG. 3 illustrates a rear close up view of a lower right corner of the garage door shown in FIG. 2.

FIG. 2 illustrates an attachment method for retaining the decorative cover A on the garage door B to allow full normal opening and closing of the garage door B. Tether devices 2, preferably a tether cord made out of nylon, for example, are tied between grommets 1 near left and right edges of the top and bottom of decorative cover A and the garage door. A suitable tying location for the opposite ends of the tether devices 2 is a hinge member of the garage door located between the top and bottom ends of the decorative cover as best illustrated in the close up view of FIG. 3.

Figure 4:
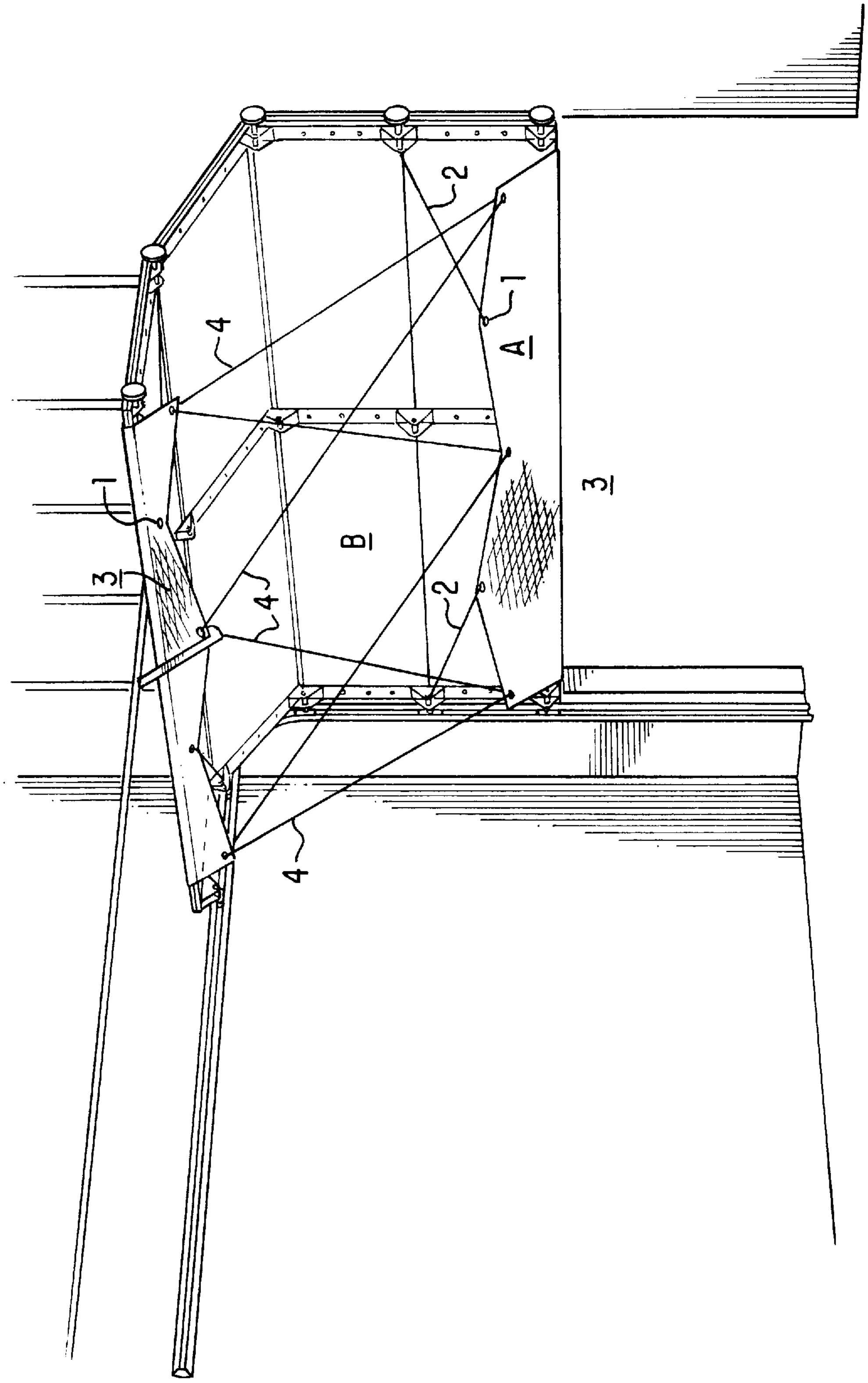
FIG. 4 illustrates another rear perspective view of the garage door and decorative cover with the garage door opened half way.

Flexible attachment device 4, preferably a bungie-type cord, connects one or more grommets 1 in the top end of the cover A with one or more grommets 2 in the bottom end of the cover A to take up slack in the cover and to accommodate the expansion of the door as it follows the curvilinear track during opening of the garage door B as best illustrated in FIG. 4. A criss-cross attachment method is illustrated, although other attachments are contemplated. A much simpler and preferred attachment method is the use of four bungie-type, or stretchable, cords, one on each corner, attached directly to a hinge member of the garage door.

A method of installation of the decorative cover will now be described with reference to FIGS. 1–2 and 4. As previously stated, the cover A may be sized in one dimension to be larger than the corresponding garage door B, to completely cover the door and allow the attachment devices to be hidden from view on the front side. While the garage door B is at least partially open, the top and bottom ends of the cover A are wrapped around the garage door B. Tether devices 2 can then be tied from grommets 1 to the hinges on the back side of the garage door B as shown. The flexible attachment device 4 (bungie-type cord) is wrapped through one or more of the grommets 1 to elastically connect the top and bottom ends of cover A. As shown in both the closed position (FIG. 2) and the open position (FIG. 4), the flexible attachment device 4 takes up slack in the decorative cover A.

Alternatively, the attachment devices can include zippers, snaps, cords, Velcro, hooks, adhesives, magnets or other equivalent structures for removably, but stretchably, affixing the decorative cover to the garage door B to accommodate opening and closing of the garage door B. For example, hooks could be provided on the cover for attachment to the door. The hooks could be provided on the end of a strap for attachment directly to the garage door or to each other. Additional examples of these will be described with reference to FIGS. 5–7.

Figure 5:
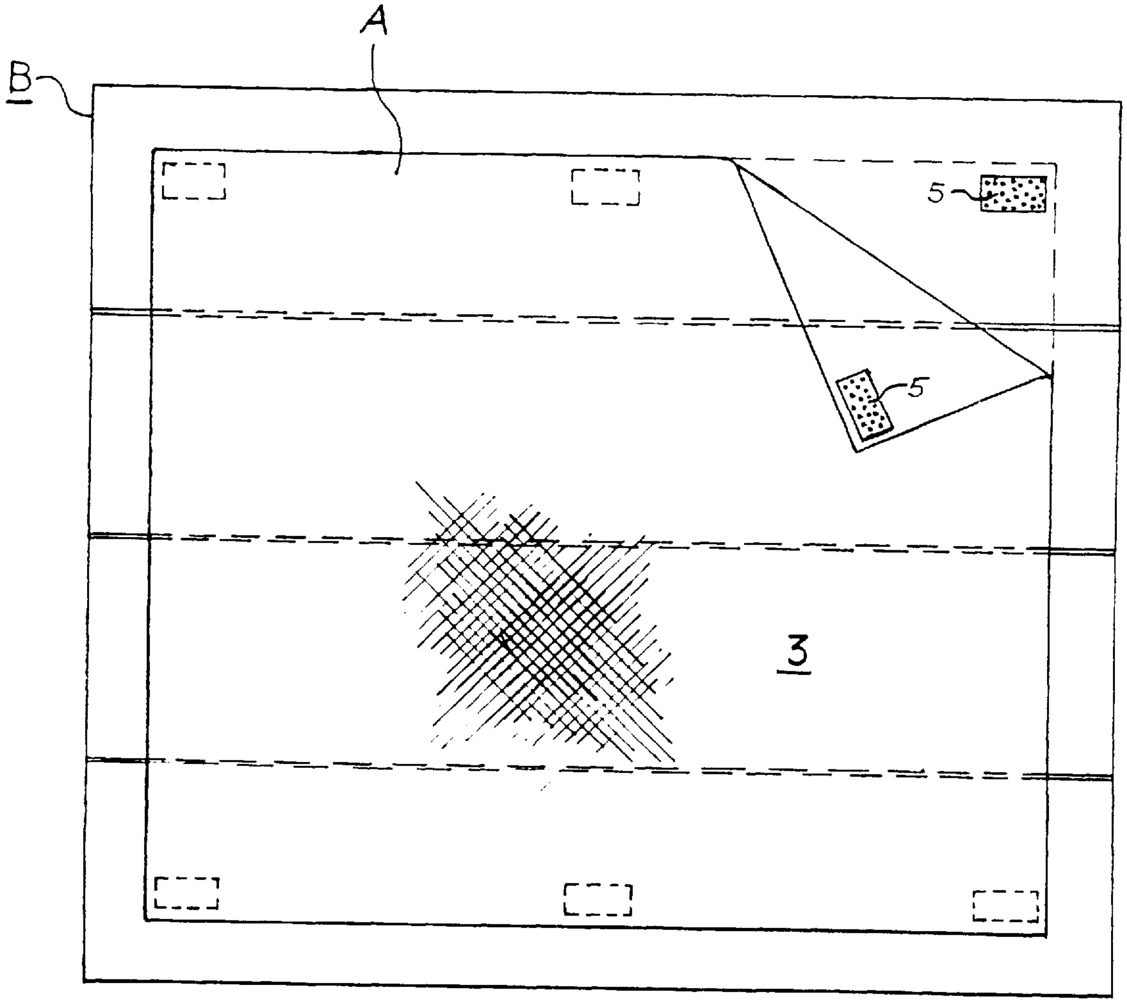
FIG. 5 illustrates a front view of the cover attached to the door by velcro.

Velcro or snaps could also be used by providing ends of the decorative cover with velcro 5 and have mating velcro 5 attached to the garage door, either on the back side or the front side, as shown in FIG. 5. The material of the cover itself in such an embodiment would be of a stretchable material, such as spandex, so as to stretchably take up slack when the door is closed and allow expansion of the cover while the door is fully opened and closed while the ends of the cover are fixedly attached by velcro 5. Snaps fasteners, magnets, and adhesives, such as double-sided tape, could be substituted for the velcro and would operate similarly.

Alternatively, a flexible, stretchable strap may be affixed to top and bottom and/or sides of the cover with velcro or snaps at an end thereof for mating with a corresponding attachment device affixed to the door. The attachment devices may be provided on either the rear side, which retains them out of view from the outside, or on the front side of the door.

Figure 6:
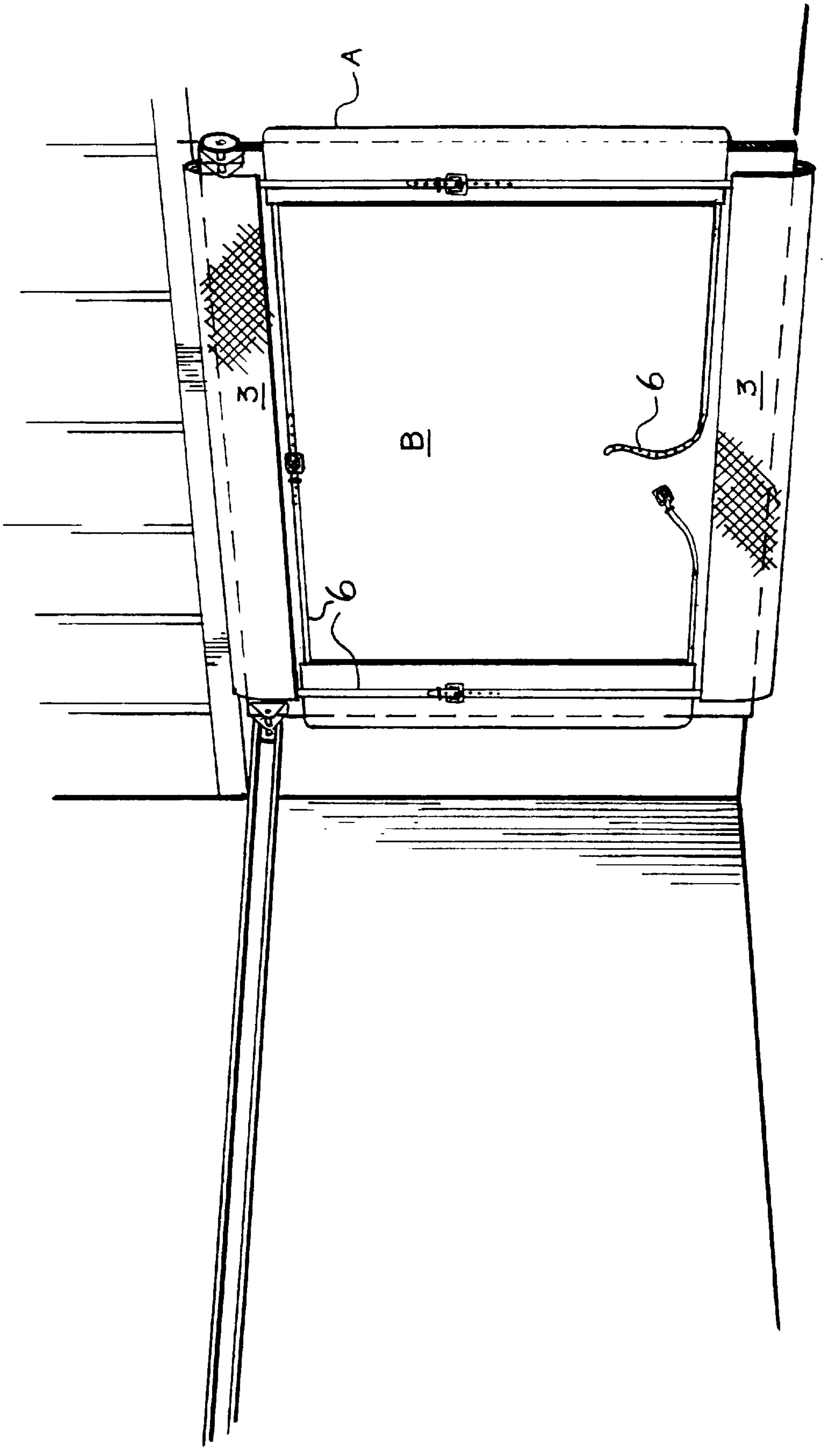
FIG. 6 illustrates a rear view of the cover installed to the or using a buckle feature along top, bottom and sides

Buckles and straps could also be used by providing a top end of the cover with straps and a bottom end with buckles of a strap/buckle pair 6 that interlock with each other as illustrated in FIG. 6. If desired, sides of the cover could also be attached by the buckles and straps, or by any of the other attachment devices. In this embodiment, the straps 6 may be stretchable or, alternatively, the cover material may be stretchable to take up its own slack. Of course, the orientation could be reversed. Alternatively, the buckles/straps could be used to attach the cover directly to the garage door by one buckle/strap being affixed to the door for connection to a corresponding buckle/strap affixed to the decorative cover.

Additionally, a device may be provided for fixing a position of a part of the cover with respect to the door so that the cover remains properly positioned and does not "walk" relative to the door. Although the strap/buckle combination will eliminate slack when the door is closed, a velcro, double-sided tape or similar attachment device may be used to fix a single point of the cover to the door so the cover is returned to the same position each time the door is closed.

Figure 7:
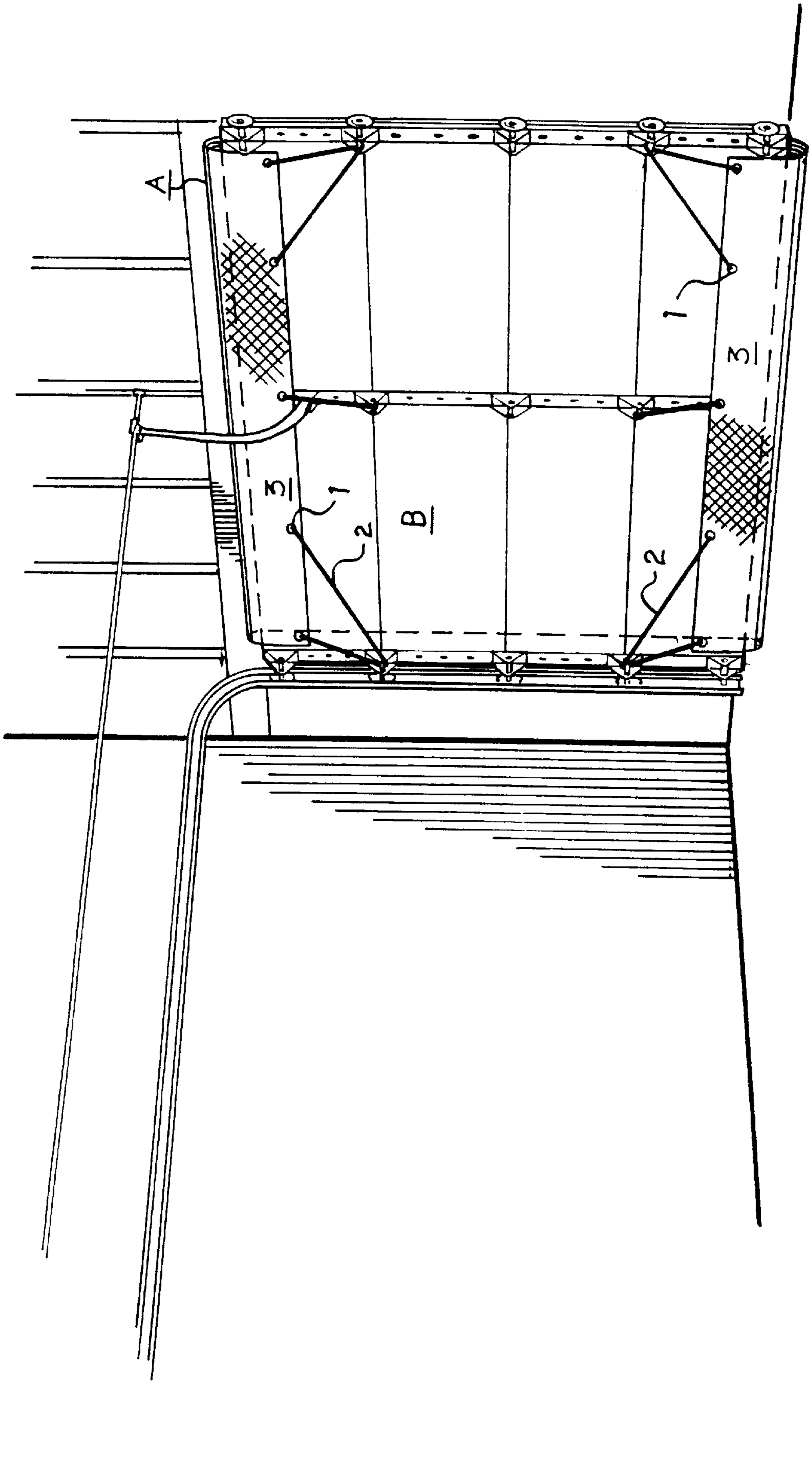
FIG. 7 illustrates a preferred method of attachment of the cover to the door.

FIG. 7 illustrates a preferred attachment arrangement similar to FIG. 2. However, rather than providing separate tether cords 2 and flexible attachment devices 4, the tether cords 2 themselves are flexible and may be bungie-type cords. In such an arrangement, tether cords 2 are preferably provided at least top and bottom corners, although they could additionally be provided along the side, if desired, for additional support. Tether cords 2 attach grommets 1 of the decorative cover directly to the garage door.

The invention has been described with reference to the preferred embodiments thereof, which are illustrative and not limiting. Various changes may be made without departing from the spirit and scope of the invention as defined in the appended claims.

What is claimed is:

1. A method of releasably fixing a decorative cover to a movable garage door, comprising:

providing a decorative cover for attachment to a garage door;

providing at least top and bottom edges of the cover with attachment devices;

draping the decorative cover over a front of the garage door;

attaching at least some of the attachment devices directly to the garage door in a manner that allows partial movement of the decorative cover;

providing a flexible attachment of the cover relative to the garage door to take up slack in the decorative cover and accommodate sufficient movement of the decorative cover to allow for complete opening and closing of the garage door while preventing the decorative cover from riding up or down relative to the garage door.

2. The method of claim 1, further comprising a step of providing printed indicia on an externally facing side of the decorative cover.

3. The method of claim 1, wherein the top and bottom edges of the decorative cover include attachment devices comprising a plurality of spaced grommets and a plurality of tether cords, said step of attaching the decorative cover to the garage door including tying one end of a tether cord to a grommet located near left and right sides of each of the top and bottom edges and tying an opposite end of the tether cord to a portion of the garage door.

4. The method of claim 3, wherein one or more flexible cords are connected between at least one grommet located along the top edge and at least one grommet located along the bottom edge of the decorative cover.

5. The method of claim 3, wherein the step of providing a flexible attachment includes running an elastic cord through a plurality of the grommets in a crisscross pattern.

6. The method of claim 3, wherein the step of attaching the decorative cover to the garage door includes tying said opposite end of the tether cord to a door hinge of the garage door.

7. The method of claim 6, wherein the opposite end of the tether cord is tied to a door hinge located between the top edge and the bottom edge of the decorative cover.

8. The method of claim 1, wherein the cover is stretchable and performs the step of providing a flexible attachment and takes up slack to allow for complete opening and closing of the garage door.

9. The method of claim 1, wherein the attachment devices are chosen from the group consisting of velcro, snaps, hooks, buckles, tether cords, zippers, magnets and adhesives.

10. A combination garage door and decorative cover, comprising:

a garage door positionable between open and closed positions;

a decorative cover fixedly located on opposite sides of an exterior front side of the garage door; and attachment devices for affixing at least top and bottom ends of the decorative cover to the garage door;

means for allowing partial movement of the decorative cover to allow for normal opening and closing of the garage door without the decorative cover riding up or down relative to the garage door.

11. The combination garage door and decorative cover of claim 10, wherein said means for allowing partial movement includes at least one stretchable attachment device to take up slack in the decorative cover and accommodate sufficient movement of the decorative cover to allow for complete opening and closing of the garage door.

12. The garage door and decorative cover of claim 10, wherein said decorative cover is insulative.

13. The garage door and decorative cover of claim 10, wherein an exterior surface of the decorative cover includes decorative printed indicia.

14. The garage door and decorative cover of claim 10, wherein said attachment devices directly affixing the decorative cover to the garage door include one or more grommets located near the top and bottom ends of the decorative cover and a tether cord attached directly between the one or more grommets and the garage door.

15. The garage door and decorative cover of claim 14, wherein said tether cord is attached directly between the one or more grommets and a hinge of the garage door.

16. The garage door and decorative cover of claim 14, wherein said tether cord is attached to the garage door at a position between the top and bottom ends of the decorative cover.

17. The garage door and decorative cover of claim 14, wherein said means for allowing partial movement includes at least one elastic cord.

18. The garage door and decorative cover of claim 10, wherein said attachment devices are chosen from the group consisting of velcro, snaps, hooks, buckles, tether cords, zippers, magnets and adhesives.

19. The garage door and decorative cover of claim 10, wherein the cover is stretchable forms at least part of the means for allowing partial movement and takes up slack to allow for complete opening and closing of the garage door.

20. The garage door and decorative cover of claim 10, wherein sides of the cover are additionally provided with attachment devices.

21. A combination garage door and decorative cover, comprising:

a garage door positionable between open and closed positions;

a decorative cover fixedly located on opposite ends of an exterior front side of the garage door; and attachment devices affixing top and bottom ends of the decorative cover directly to the garage door in a manner that allows partial movement of the decorative cover to allow for normal opening and closing of the garage door and taking up of slack in the decorative cover without the decorative cover riding up or down relative to the garage door.

22. The garage door and decorative cover of claim 21, wherein said attachment devices include at least one elastic cord.

23. The garage door and decorative cover of claim 21, wherein said attachment devices include at least one non-stretchable tether cord.

24. The garage door and decorative cover of claim 21, wherein said attachment devices are chosen from the group consisting of velcro, snaps, hooks, buckles, tether cords, zippers, magnets and adhesives.

* * * * *